(12) United States Patent
Coleman et al.

(10) Patent No.: US 6,640,542 B2
(45) Date of Patent: Nov. 4, 2003

(54) BYPASS VENTURI ASSEMBLY WITH SINGLE SHAFT ACTUATOR FOR AN EXHAUST GAS RECIRCULATION SYSTEM

(75) Inventors: Gerald N. Coleman, Peoria, IL (US);
Dennis D. Feucht, Morton, IL (US);
Michael P. Harmon, Dunlap, IL (US);
David A. Pierpont, Peoria, IL (US);
Matthew D. Rampenthal, Chillicothe, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/028,634

(22) Filed: Dec. 20, 2001

(65) Prior Publication Data
US 2003/0115874 A1 Jun. 26, 2003

(51) Int. Cl.[7] ............................................... F02B 33/44
(52) U.S. Cl. .............................. 60/605.2; 123/568.17; 123/568.19; 137/607
(58) Field of Search ...................... 60/605.2, 605.1; 123/568.17, 568.19, 568.11, 568.12, 568.18, 568.2, 568.26, 568.27, 568.29; 137/607

(56) References Cited

U.S. PATENT DOCUMENTS

| | | | | |
|---|---|---|---|---|
| 3,680,534 A | * | 8/1972 | Chavant | 123/568.17 |
| 3,851,470 A | * | 12/1974 | Kaufmann, Jr. | 60/298 |
| 4,924,840 A | * | 5/1990 | Wade | 123/568.19 |
| 5,425,239 A | * | 6/1995 | Gobert | 60/605.2 |
| 5,611,204 A | | 3/1997 | Radovanovic et al. | 60/605.2 |
| 5,802,846 A | | 9/1998 | Bailey | 60/605.2 |
| 6,003,316 A | | 12/1999 | Baert et al. | 60/605.2 |
| 6,116,026 A | | 9/2000 | Freese, V | 60/605.2 |
| 6,216,458 B1 | * | 4/2001 | Alger et al. | 60/605.2 |
| 6,267,106 B1 | * | 7/2001 | Feucht | 123/568.17 |
| 6,343,594 B1 | * | 2/2002 | Koeslin et al. | 123/568.17 |
| 6,351,946 B1 | * | 3/2002 | Faletti | 60/605.2 |
| 6,401,699 B1 | * | 6/2002 | Persson et al. | 123/568.17 |
| 6,502,397 B1 | * | 1/2003 | Lundqvist | 60/605.2 |

FOREIGN PATENT DOCUMENTS

| | | | | |
|---|---|---|---|---|
| DE | 42 35 794 C1 | 10/1993 | | F02M/25/07 |
| DE | 44 29 232 C1 | 9/1995 | | F02M/25/07 |
| DE | 196 80 305 C2 | 1/1999 | | F02M/25/07 |
| DE | 197 34 801 A1 | 2/1999 | | F02D/21/08 |
| DE | 198 53 119 C2 | 11/2000 | | F02M/25/07 |
| EP | 0 857 870 A2 | 8/1998 | | F02M/25/07 |
| EP | 1 002 947 A1 | 5/2000 | | F02M/25/07 |
| EP | 1 020 632 A1 | 7/2000 | | F02M/25/07 |

* cited by examiner

Primary Examiner—Thomas Denion
Assistant Examiner—Thai-Ba Trieu
(74) Attorney, Agent, or Firm—Todd T Taylor

(57) ABSTRACT

An internal combustion engine, particularly suitable for use in a work machine, is provided with a combustion air supply and an exhaust manifold. A bypass venturi assembly includes a housing having an outlet, a combustion air inlet and an exhaust gas inlet. A center piece is positioned within the housing and is in communication with the combustion air inlet. The center piece defines a combustion air bypass section therein. A combustion air bypass valve is positioned in association with the combustion air bypass section. An exhaust gas valve is positioned in association with the exhaust gas inlet. A single shaft is coupled with and carries each of the combustion air bypass valve and the exhaust gas valve.

21 Claims, 3 Drawing Sheets

BYPASS VENTURI ASSEMBLY WITH SINGLE SHAFT ACTUATOR FOR AN EXHAUST GAS RECIRCULATION SYSTEM

TECHNICAL FIELD

The present invention relates to exhaust gas recirculation systems in an internal combustion engine, and, more particularly, to an induction venturi in such exhaust gas recirculation systems.

BACKGROUND

An exhaust gas recirculation (EGR) system is used for controlling the generation of undesirable pollutant gases and particulate matter in the operation of internal combustion engines. Such systems have proven particularly useful in internal combustion engines used in motor vehicles such as passenger cars, light duty trucks, and other on-road motor equipment. EGR systems primarily recirculate the exhaust gas by-products into the intake air supply of the internal combustion engine. The exhaust gas which is reintroduced to the engine cylinder reduces the concentration of oxygen therein, which in turn lowers the maximum combustion temperature within the cylinder and slows the chemical reaction of the combustion process, decreasing the formation of nitrous oxides (NoX). Furthermore, the exhaust gases typically contain unburned hydrocarbons which are burned on reintroduction into the engine cylinder, which further reduces the emission of exhaust gas by-products which would be emitted as undesirable pollutants from the internal combustion engine.

When utilizing EGR in a turbocharged diesel engine, the exhaust gas to be recirculated is preferably removed upstream of the exhaust gas driven turbine associated with the turbocharger. In many EGR applications, the exhaust gas is diverted directly from the exhaust manifold. Likewise, the recirculated exhaust gas is preferably reintroduced to the intake air stream downstream of the compressor and air-to-air aftercooler (ATAAC). Reintroducing the exhaust gas downstream of the compressor and ATAAC is preferred due to the reliability and maintainability concerns that arise if the exhaust gas passes through the compressor and ATAAC. An example of such an EGR system is disclosed in U.S. Pat. No. 5,802,846 (Bailey), which is assigned to the assignee of the present invention.

With conventional EGR systems as described above, the charged and cooled combustion air which is transported from the ATAAC is at a relatively high pressure as a result of the charging from the turbocharger. Since the exhaust gas is also typically inducted into the combustion air flow downstream of the ATAAC, conventional EGR systems are configured to allow the lower pressure exhaust gas to mix with the higher pressure combustion air. Such EGR systems may include a venturi section which induces the flow of exhaust gas into the flow of combustion air passing therethrouglh. An efficient venturi section is designed to "pump" exhaust gas from a lower pressure exhaust manifold to a higher pressure intake manifold. However, because varying EGR rates are required throughout the engine speed and load range, a variable office venturi may be preferred. Such a variable orifice venturi is physically difficult and complex to design and manufacture. Accordingly, venturi systems including a fixed orifice venturi and a combustion air bypass circuit are favored. The bypass circuit consists of piping and a butterfly valve in a combustion air flow path. The butterfly valve is controllably actuated using an electronic controller which senses various parameters associated with operation of the engine.

With a venturi section as described above, the maximum flow velocity and minimum pressure of the combustion air flowing through the venturi section occurs within the venturi throat disposed upstream from the expansion section. The butterfly valve is used to control the flow of combustion air to the venturi throat, which in turn affects the flow velocity and vacuum pressure created therein. By varying the vacuum pressure, the amount of exhaust gas which is induced into the venturi throat of the venturi section can be varied. However, inducing the exhaust gas into the flow of combustion air in the venturi throat may affect the diffusion and pressure recovery of the mixture within the expansion section of the venturi.

The present invention is directed to overcoming one or more of the problems as set forth above.

SUMMARY OF THE INVENTION

In one aspect of the invention, an internal combustion engine is provided with a combustion air supply and an exhaust manifold. A bypass venturi assembly includes a housing having an outlet, a combustion air inlet and an exhaust gas inlet. A center piece is positioned within the housing and is in communication with the combustion air inlet. The center piece defines a combustion air bypass section therein. A combustion air bypass valve is positioned in association with the combustion air bypass section. An exhaust gas valve is positioned in association with the exhaust gas inlet. A single shaft is coupled with and carries each of the combustion air bypass valve and the exhaust gas valve.

In another aspect of the invention, a method of recirculating exhaust gas in an internal combustion engine is provided with the steps of providing a housing having an outlet, a combustion air inlet and an exhaust gas inlet; positioning a center piece within the housing and in communication with the combustion air inlet, the center piece having a combustion air bypass section therein; positioning a combustion air bypass valve within the combustion air bypass section; positioning an exhaust gas valve in association with the exhaust gas inlet; coupling each of the combustion air bypass valve and the exhaust gas valve with a single shaft; operating the single shaft to thereby control an operating position of each of the combustion air bypass valve and the exhaust gas valve; and inducting exhaust gas into a flow of combustion air, dependent upon the operating step.

DETAILED DESCRIPTION

Figure 1:
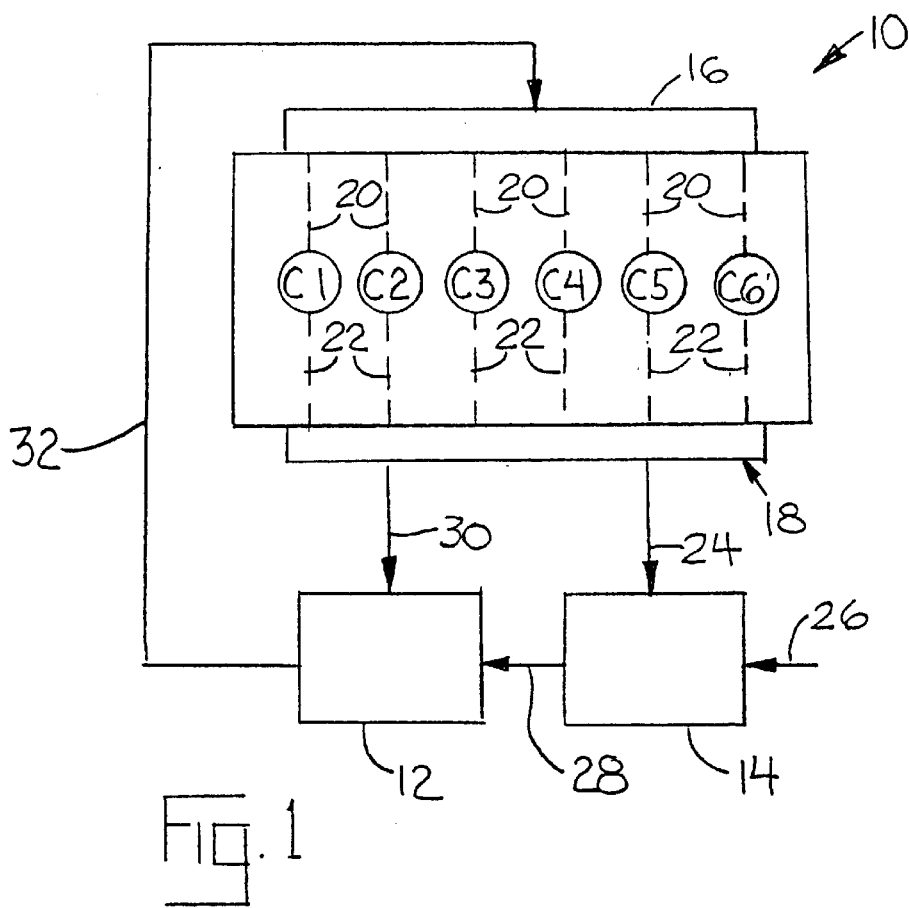
FIG. 1 is a schematic illustration of an embodiment of an internal combustion engine of the present invention.

Referring now to the drawings, and more particularly to FIG. 1, there is shown an embodiment of an internal combustion engine 10, including an embodiment of a bypass venturi assembly 12 of the present invention. Internal combustion engine 10 also includes a combustion air supply 14, intake manifold 16 and exhaust manifold 18.

Intake manifold 16 and exhaust manifold 18 are each fluidly coupled with a plurality of combustion cylinders C1 through C6, as indicated schematically by dashed lines 20 and 22, respectively. In the embodiment shown, a single intake manifold 16 and a single exhaust manifold 18 are fluidly coupled with combustion cylinders C1 through C6. However, it is also possible to configure intake manifold 16 and/or exhaust manifold 18 as a split or multiple-piece manifold, each associated with a different group of combustion cylinders.

Combustion air supply 14 provides a source of pressurized combustion air to bypass venturi assembly 12, and ultimately to intake manifold 16. Combustion air supply 14 includes a turbocharger and an ATAAC, each of which may be of common construction and thus not specifically shown in FIG. 1 for simplicity. The turbocharger includes a turbine and a compressor therein. The turbine, in known manner, is driven by exhaust gas received from exhaust manifold 18 via fluid line 24. The turbine is mechanically coupled with the compressor, which receives ambient combustion air as indicated by arrow 26. The compressor compresses the ambient combustion air and outputs compressed combustion air to the ATAAC. The compressed combustion air is at an elevated temperature as a result of the work which is performed thereon during the compression process within the turbocharger. The hot combustion air is then cooled within the ATAAC.

Bypass venturi assembly 12 receives cooled and compressed combustion air via line 28, and also receives exhaust gas via line 30. The exhaust gas line 30 may include an exhaust gas cooler therein (not shown). Bypass venturi assembly 12 controllably mixes a selected amount of exhaust gas with the cooled and compressed combustion air and outputs the air/exhaust gas mixture to intake manifold 16 via line 32. More particularly, and referring to FIGS. 2–4, bypass venturi assembly 12 includes a housing 34 having a combustion air inlet 36, an outlet 38 and an exhaust gas inlet 40. Housing 34, in the embodiment shown, is constructed as a two-part housing for manufacturing purposes. Combustion air inlet 36 is connected and in communication with combustion air supply 14 via line 28. Exhaust gas inlet 40 is connected and in communication with exhaust manifold 18 via line 30. Outlet 38 is connected and in communication with intake manifold 16 via line 32.

Bypass venturi assembly 12 includes a center piece 42 positioned within housing 34. Center piece 42 is positioned adjacent to and in communication with combustion air inlet 36. A sleeve 44 is also positioned within housing 34. A plurality of holes 45 arc positioned in the venturi assembly 12 between the housing 34 and the sleeve 44. Center piece 42 is formed with an annular recess 46 which faces toward and receives an end of sleeve 44. Center piece 42 and sleeve 44 conjunctively define a combustion air bypass section 48 therein which terminates at outlet 38. In the embodiment shown, center piece 42 is annular shaped and has a through bore 50. Through bore 50 within center piece 42 is substantially cylindrical shaped. However, the particular configuration of through bore 50 may vary, depending upon the particular application.

Combustion air bypass valve 52 is positioned within through bore 50 of center piece 42. Combustion air bypass valve 52 is configured to selectively open and close combustion air bypass section 48. In the embodiment shown, combustion air bypass valve 52 is in the form of a butterfly valve which is controllably actuated by an ECM (not shown) to thereby control an amount of combustion air which flows through combustion air bypass section 48.

Exhaust gas valve 54 is positioned within exhaust gas inlet 40 and is controllably actuated to open and close exhaust gas inlet 40. In the embodiment shown, exhaust gas valve 54 is in the form of a butterfly valve which is controllably actuated by an ECM. Exhaust gas inlet 40 is substantially cylindrical shaped with an inside diameter which is sized relative to exhaust gas valve 54 to be selectively opened and closed thereby.

Figure 2:
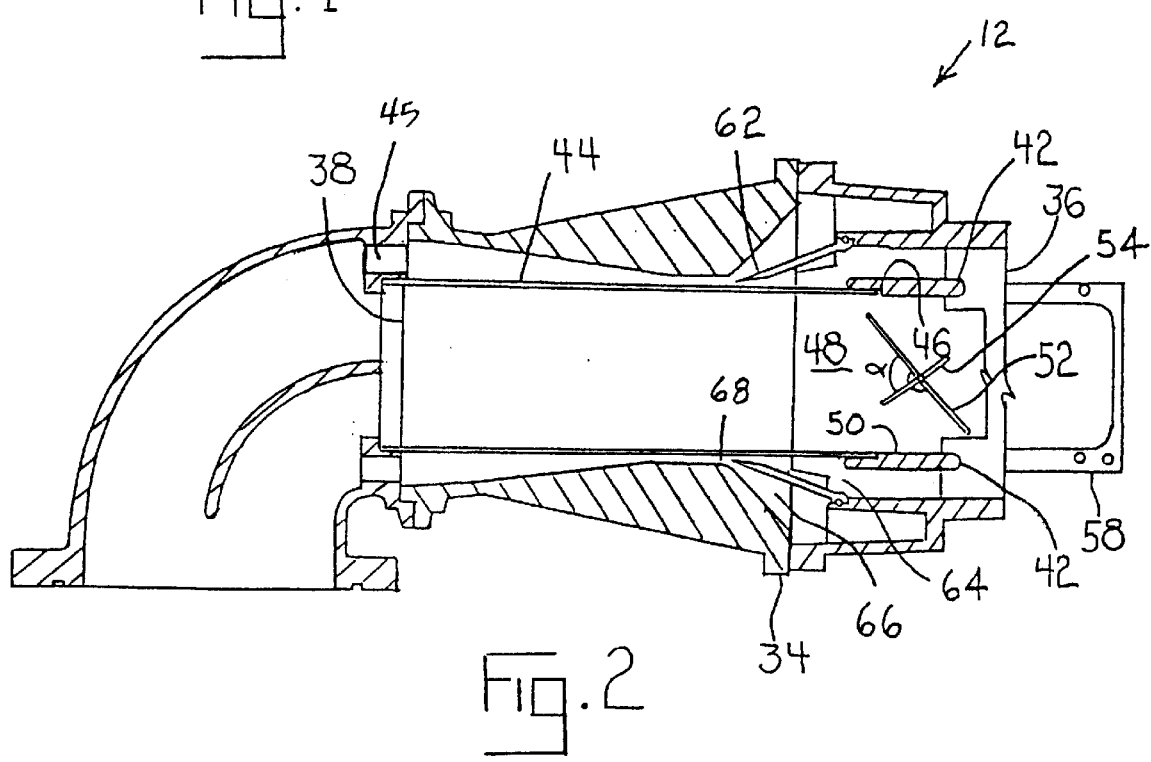
FIG. 2 is a top view of an embodiment of a bypass venturi assembly of the present invention.

Single shaft 56 is coupled with and carries each of combustion air bypass valve 52 and exhaust gas valve 54. Single shaft 56 includes a pair of notches (not numbered) which respectively interface with combustion air bypass valve 52 and exhaust gas valve 54. The notches are formed in single shaft 56 such that combustion air bypass valve 52 and exhaust gas valve 54 are positioned at a predetermined angular orientation c relative to each other, as shown in FIG. 2. In the embodiment shown, combustion air bypass valve 52 and exhaust gas valve 54 are positioned relative to each other at the angle a such that when combustion air bypass valve 52 is completely closed exhaust gas valve 54 is completely opened, and vice versa. The manufactured angle a may be varied to obtain different mixer characteristics for various applications.

Single shaft 56 is controllably actuated using a single actuator 58, which in turn is controllably actuated using an ECM. Control by the ECM may be dependent upon selected input parameters received from sensor signals, such as engine load, intake manifold pressure, engine temperature, etc. The ECM may be configured to carry out the control logic using software, hardware, and/or firmware, depending upon the particular configuration.

Single shaft 56 is biased using a leaf-type coil spring 60. Shaft 56 is biased in a rotational direction such that combustion air bypass valve 52 is biased to an open position. Thus, if control of actuator 58 fails, combustion air bypass valve is biased in a fail safe manner to the open position to allow combustion air to flow therethrough.

Venturi nozzle 62 is attached to and carried by housing 34. Venturi nozzle 62 is positioned within housing 34 in association with each of combustion air inlet 36 and exhaust gas inlet 40. Venturi nozzle 62 defines a combustion air venturi section 64 with sleeve 44. Likewise, venturi nozzle 62 defines an exhaust gas venturi section 66 with housing 34 through which exhaust gas flows. Venturi nozzle 62 includes a distal end which defines an induction area 68 at which exhaust gas is inducted into the flow of passing combustion air.

Figure 3:
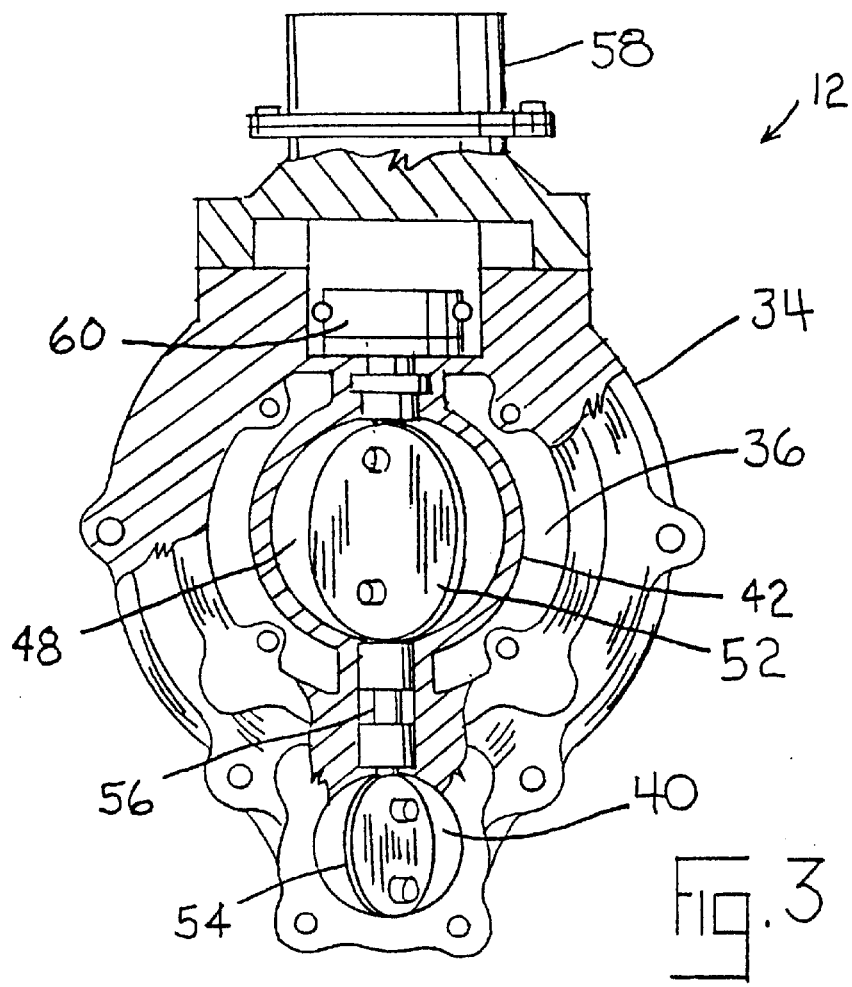
FIG. 3 is a plan view of the bypass venturi assembly shown in FIGS. 1 and 2.
Figure 4:
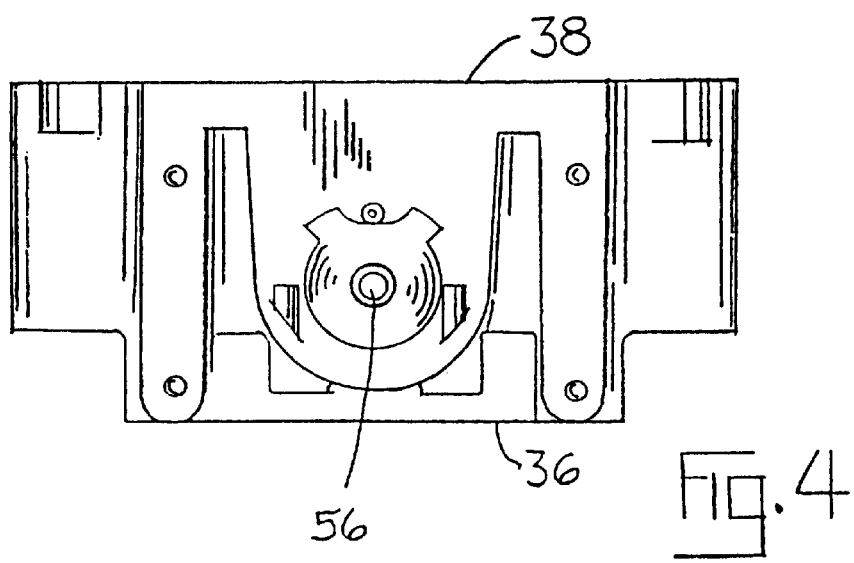
FIG. 4 is a bottom view of the bypass venturi assembly shown in FIGS. 1–3.
Figure 5:
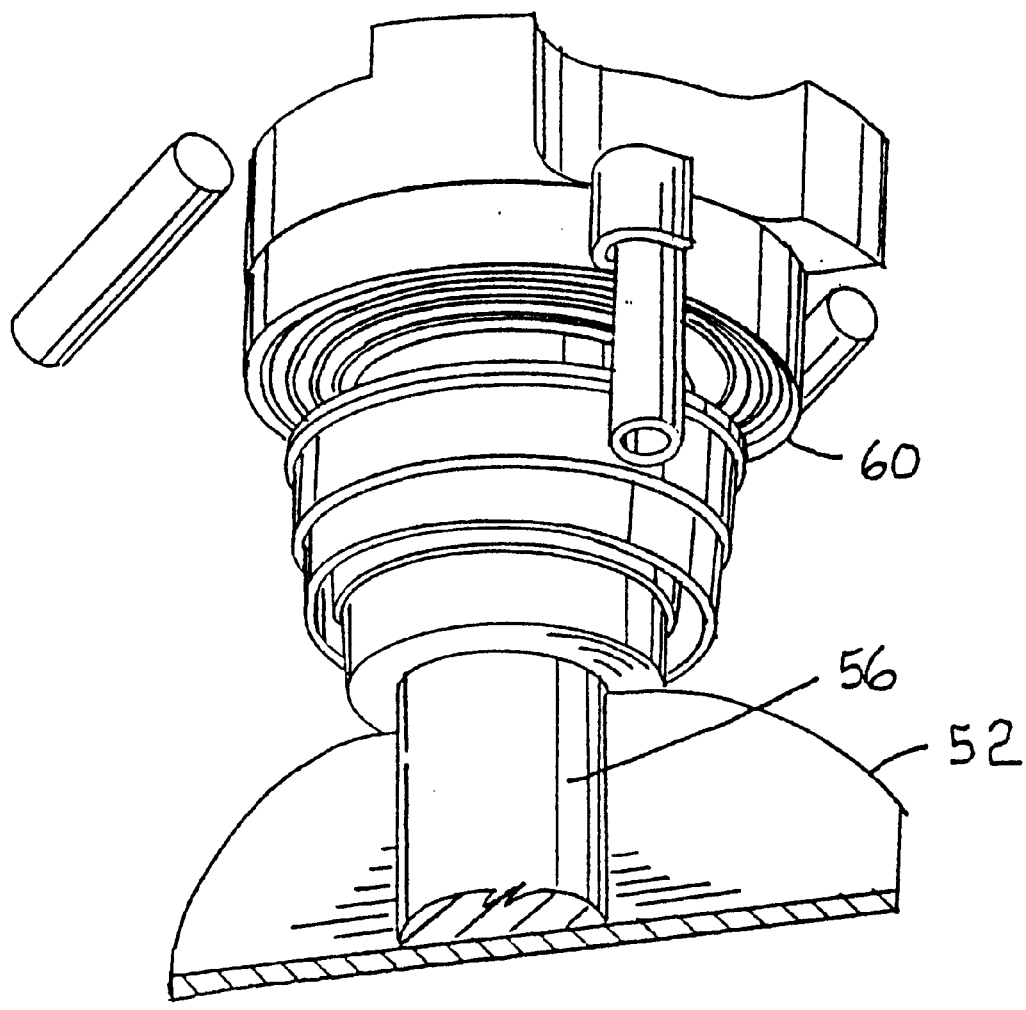
FIG. 5 is a perspective, fragmentary view of a portion of the bypass venturi assembly shown in FIGS. 1–4.

Center piece 42 supports shaft 56, and in turn supports combustion air bypass valve 52 and exhaust gas valve 54. More particularly, center piece 42 supports shaft 56 on opposite sides of combustion air bypass valve 52. Additionally, center piece 42 supports the end of shaft 56 and exhaust gas valve 54 in a cantilever manner as best seen in FIG. 3. By supporting shaft 56 in this manner using center piece 42, only two areas of contact occur with shaft 56, thereby eliminating alignment errors which might otherwise occur if an additional opening and support area were defined in the far distal end of housing 34 adjacent exhaust gas inlet 40. This improves reliability and reduces manufacturing costs. Additionally, openings are eliminated from housing 34 which might tend to allow leakage of exhaust gas to the ambient environment.

INDUSTRIAL APPLICABILITY

During use, combustion occurs within combustion cylinders C1 through C6 which produces exhaust gas received within exhaust manifold 18. Exhaust gas is transported to the turbocharger within combustion air supply 14 via fluid line 24 for rotatably driving the turbine within the turbocharger. The turbine rotatably drives the compressor, which in turn compresses the combustion air and outputs hot, compressed combustion air to the ATAAC, where it is cooled and transported via line 28 to combustion air inlet 36 of bypass venturi assembly 12.

The ECM controllably actuates actuator 58, which in turn rotates shaft 56, combustion air bypass valve 52 and exhaust gas valve 54 to a desired position. The position of combustion air bypass valve 52 controls the amount of compressed combustion air which bypasses through combustion air bypass section 48 within center piece 42 and sleeve 44. The amount of combustion air flowing through combustion air bypass section 48 in turn controls the amount of combustion air which flows through combustion air venturi section 64 adjacent venturi nozzle 62. As the combustion air flows through combustion air venturi section 64, the velocity thereof increases and the pressure decreases. Exhaust gas flows through exhaust gas venturi section 66 and is inducted into the flow of reduced pressure combustion air within induction area 68. Depending upon the pressure and velocity of combustion air which flows through combustion air venturi section 64, the amount of exhaust gas which is inducted into the passing flow of combustion air at induction area 68 is varied. The combustion air and exhaust gas mixture flow downstream from induction area 68 and mix with the combustion air flowing through combustion air bypass section 48 through the plurality of holes 45 at the downstream end of the venturi assembly 12. The combustion air/exhaust gas mixture is then transported from outlet 38 to intake manifold 16 via line 32. By varying-the position of each of combustion air bypass valve 52 and exhaust gas valve 54 using the ECM based upon varying operating parameters as described above, the amount of exhaust gas which is inducted into the combustion air may likewise be varied.

Bypass venturi assembly 12 of the present invention allows exhaust gas to be effectively and controllably inducted into a pressurized flow of combustion air using a venturi assembly having a minimized overall length. The reduced overall size of bypass venturi assembly 12 allows it to be positioned within the tight geometric constraints of an engine compartment in a motor vehicle. The bypass venturi assembly may either be carried by the frame of the vehicle, engine block, engine head, or other suitable mounting location within the engine compartment. Single shaft 56 carries each of combustion air bypass valve 52 and exhaust gas valve 54, thereby only requiring a single actuator 58 for control of exhaust gas which is inducted into the combustion air. Shaft 56 is biased in a fail safe manner such that combustion air bypass section 48 is opened should electronic control fail. By supporting single shaft 56 only on opposite sides of combustion air bypass valve 52, tolerance errors are eliminated and manufacturing costs are reduced. Thus, the bypass venturi assembly provides a compact design with simple and efficient operation.

Other aspects, objects and advantages of this invention can be obtained from a study of the drawings, the disclosure and the appended claims.

What is claimed is:
1. An internal combustion engine, comprising:
   a combustion air supply;
   an exhaust manifold; and
   a bypass venturi assembly, including:
      a housing having an outlet, a combustion air inlet and an exhaust gas inlet;
      a center piece positioned within said housing and in communication with said combustion air inlet, said center piece defining a combustion air bypass section therein;
      a combustion air bypass valve positioned in association with said combustion air bypass section;
      an exhaust gas valve positioned in association with said exhaust gas inlet; and
      a single shaft coupled with and carrying each of said combustion air bypass valve and said exhaust gas valve.

2. The internal combustion engine of claim 1, said single shaft carrying said combustion air bypass valve at a predetermined angular orientation relative to said exhaust gas valve.

3. The internal combustion engine of claim 1, including a venturi nozzle in communication with said combustion air inlet, said venturi nozzle defining a combustion air venturi section and an exhaust gas venturi section, said exhaust gas valve positioned to open and close said exhaust gas venturi section.

4. The internal combustion engine of claim 1, said center piece being annular shaped and having a through bore, said combustion air bypass valve disposed within said through bore.

5. An internal combustion engine comprising:
   a combustion air supply;
   an exhaust manifold; and
   a bypass venturi assembly, including:
      a housing having an outlet, a combustion air inlet and an exhaust gas inlet;
      a center piece positioned within said housing and in communication with said combustion air inlet, said center piece defining a combustion air bypass section therein;
      a combustion air bypass valve positioned in association with said combustion air bypass section.

6. The internal combustion engine of claim 5, said spring being a leaf-type coil spring.

7. An internal combustion engine comprising:
   a combustion air supply;
   an exhaust manifold; and
   a bypass venturi assembly, including:
      a housing having an outlet, a combustion air inlet and an exhaust gas inlet;
      a center piece positioned within said housing and in communication with said combustion air inlet, said center piece defining a combustion air bypass section therein;
      a combustion air bypass valve positioned in association with said combustion air bypass section;
      an exhaust gas valve positioned in association with said exhaust gas inlet; and
      a single shaft coupled with and carrying each of said combustion air bypass valve and said exhaust gas valve; and
      said single shaft being supported on opposite sides of said combustion air bypass valve by said center piece, said single shaft and said exhaust gas valve being supported in a cantilever manner by said center piece.

8. The internal combustion engine of claim 7, said center piece being annular shaped and said combustion air bypass valve being positioned within said center piece.

9. A bypass venturi assembly for recirculating exhaust gas in an internal combustion engine, comprising:
   a housing having an outlet, a combustion air inlet and an exhaust gas inlet;
   a center piece positioned within said housing and in communication with said combustion air inlet, said center piece defining a combustion air bypass section therein;

a combustion air bypass valve positioned in association with said combustion air bypass section;

an exhaust gas valve positioned in association with said exhaust gas inlet; and a single shaft coupled with and carrying each of said combustion air bypass valve and said exhaust gas valve.

10. The bypass venturi assembly of claim 9, said single shaft carrying said combustion air bypass valve at a predetermined angular orientation relative to said exhaust gas valve.

11. The bypass venturi assembly of claim 9, including a venturi nozzle in communication with said combustion air inlet, said venturi nozzle defining a combustion air venturi section and an exhaust gas venturi section, said exhaust gas valve positioned to open and close said exhaust gas venturi section.

12. The bypass venturi assembly of claim 9, said center piece being annular shaped and having a through bore, said combustion air bypass valve disposed within said through bore.

13. A bypass venturi assembly for recirculating exhaust gas in an internal combustion engine, comprising:

a housing having an outlet, a combustion air inlet and an exhaust gas inlet;

a center piece positioned within said housing and in communication with said combustion air inlet, said center piece defining a combustion air bypass section therein;

a combustion air bypass valve positioned in association with said combustion air bypass section;

an exhaust gas valve positioned in association with said exhaust gas inlet; and a single shaft coupled with and carrying each of said combustion air bypass valve and said exhaust gas valve; and a spring biasing said shaft and in turn biasing said combustion air bypass valve to an open position.

14. The bypass venturi assembly of claim 13, said spring being a leaf-type coil spring.

15. A bypass venturi assembly of for recirculating exhaust gas in an internal combustion engine, comprising:

a housing having an outlet, a combustion air inlet and an exhaust gas inlet;

a center piece positioned within said housing and in communication with said combustion air inlet said center piece defining a combustion air bypass section therein;

a combustion air bypass valve positioned in association with said combustion air bypass section;

an exhaust gas valve positioned in association with said exhaust gas inlet; and a single shaft coupled with and carrying each of said combustion air bypass valve and said exhaust gas valve; and said single shaft being supported on opposite sides of said combustion air bypass valve by said center piece, said single shaft and said exhaust gas valve being supported in a cantilever manner by said center piece.

16. The bypass venturi assembly of claim 15, said center piece being annular shaped and said combustion air bypass valve being positioned within said center piece.

17. A method of recirculating exhaust gas in an internal combustion engine, comprising the steps of:

providing a housing having an outlet, a combustion air inlet and an exhaust gas inlet;

positioning a center piece within said housing and in communication with said combustion air inlet, said center piece having a combustion air bypass section therein;

positioning a combustion air bypass valve within said combustion air bypass section;

positioning an exhaust gas valve in association with said exhaust gas inlet;

coupling each of said combustion air bypass valve and said exhaust gas valve with a single shaft;

operating said single shaft to thereby control an operating position of each of said combustion air bypass valve and said exhaust gas valve; and inducting exhaust gas into a flow of combustion air, dependent upon said operating step.

18. A method of recirculating exhaust gas in an internal combustion engine, comprising the steps of:

providing a housing having an outlet, a combustion air inlet and an exhaust gas inlet;

positioning a center piece within said housing and in communication with said combustion air inlet, said center piece having a combustion air bypass section therein;

positioning a combustion air bypass valve within said combustion air bypass section;

positioning an exhaust gas valve in association with said exhaust gas inlet;

coupling each of said combustion air bypass valve and said exhaust gas valve with a single shaft;

operating said single shaft to thereby control an operating position of each of said combustion air bypass valve and said exhaust gas valve;

inducting exhaust gas into a flow of combustion air, dependent upon said operating step; and the step of biasing said single shaft such that said combustion air bypass valve is biased to an open position.

19. The method of claim 18, said biasing step being carried out using a leaf-type coil spring.

20. A method of recirculating exhaust gas in an internal combustion engine, comprising the steps of:

providing a housing having an outlet, a combustion air inlet and an exhaust gas inlet;

positioning a center piece within said housing and in communication with said combustion air inlet, said center piece having a combustion air bypass section therein;

positioning a combustion air bypass valve within said combustion air bypass section;

positioning an exhaust gas valve in association with said exhaust gas inlet;

coupling each of said combustion air bypass valve and said exhaust gas valve with a single shaft;

operating said single shaft to there by control an operating position of each of said combustion air bypass valve and said exhaust gas valve;

inducting exhaust gas into a flow of combustion air, dependent upon said operating step; and supporting said single shaft on opposite sides of said combustion air bypass valve, and supporting said single shaft and said exhaust gas valve in a cantilever manner.

21. The method of claim 20, said supporting steps being carried out using said center piece.

* * * * *

UNITED STATES PATENT AND TRADEMARK OFFICE
CERTIFICATE OF CORRECTION

PATENT NO. : 6,640,542 B2
DATED : November 4, 2003
INVENTOR(S) : Gerald N. Coleman et al.

It is certified that error appears in the above-identified patent and that said Letters Patent is hereby corrected as shown below:

<u>Column 6,</u>
Lines 21-33, claim 5 should read as follows:

-- 5. An internal combustion engine comprising:
  a combustion air supply;
  an exhaust manifold; and
  a bypass venture assembly, including:
  a housing having an outlet, a combustion air inlet and an exhaust gas inlet;
a center piece positioned within said housing and in communication with said combustion air inlet, said center piece defining a combustion air bypass section therein;
  a combustion air bypass valve positioned in association with said combustion air bypass section;
  an exhaust gas valve positioned in association with said exhaust gas inlet; and
  a single shaft coupled with and carrying each of said combustion air bypass valve and said exhaust gas valve; and
  a spring biasing said shaft and in turn biasing said combustion air bypass valve to an open position. --

Signed and Sealed this

Eleventh Day of May, 2004

JON W. DUDAS
*Acting Director of the United States Patent and Trademark Office*